United States Patent
Wirth

[15] 3,676,448
[45] July 11, 1972

[54] 2,2'-BIS(3-PYRIDINOLS)

[72] Inventor: Joseph G. Wirth, Schenectady, N.Y.

[73] Assignee: General Electric Company

[22] Filed: Jan. 7, 1970

[21] Appl. No.: 1,318

[52] U.S. Cl. .........................260/296 D, 260/240 D, 260/37, 117/33.5
[51] Int. Cl. .........................................................C07d 31/40
[58] Field of Search..................................260/240 D, 296 D

[56] References Cited

OTHER PUBLICATIONS

Otroshchenko et al., Chemical Abstracts, Vol. 63, 4248– b–d, (1965)

*Primary Examiner*—Alan L. Rotman
*Attorney*—Richard R. Brainard, Joseph T. Cohen, Paul A. Frank, Charles T. Watts, James W. Underwood, Frank L. Neuhauser, Oscar B. Waddell and Joseph B. Forman

[57] ABSTRACT

The novel compounds, 2,2'-bis(3-pyridinols), will fluoresce in the visible spectrum when exposed to ultraviolet light. The particular color emitted is dependent upon the other substituents on the pyridine ring. Generally, the parent compound and its substituted derivatives fluoresce green, unless the substituents have aromatic or aliphatic unsaturation which is conjugated with the unsaturation of the pyridine ring. This shifts the fluorescence to longer wavelengths, so that it is possible to produce compounds which fluoresce in the yellow and red portions of the visible spectrum. The compounds are readily soluble in common organic solvents and are thermally stable. They can be incorporated in various polymers to impart their fluorescent properties to the polymers. They can be incorporated in lacquers to produce films or applied as coatings on the envelope of ultraviolet lamps to produce various colored lights when energized.

5 Claims, No Drawings

2,2'-BIS(3-PYRIDINOLS)

This invention relates to 2,2'-bis(3-pyridinols), also known as 2,2'-bis(3-hydroxypyridines). More specifically, this invention relates to the chemical compounds having the formula

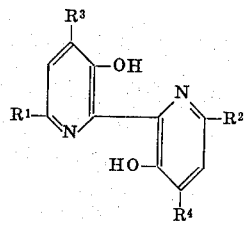

where $R^1$, $R^2$, $R^3$ and $R^4$ are independently selected from the group consisting of hydrogen, halogen, lower alkoxy, lower alkyl, phenyl substituted lower alkyl, lower alkenyl and phenyl substituted lower alkenyl. When exposed to a source of ultraviolet light, these compounds fluoresce emitting light in the visible region. The particular color which they emit depends on the R substituents.

Although there are many known organic compounds which have fluorescent properties, generally the visible light which they emit is so weak that they can not be incorporated in minor amounts into other compositions to impart fluorescent properties thereto. Only very few organic compounds have strongly fluorescent properties so that they can be used in such applications. However, these materials generally are photochemically, oxidatively or thermally unstable at relatively low elevated temperatures so that upon long term exposure to ultraviolet light, air and especially at elevated temperatures, they lose their fluorescent properties.

For most applications, requiring long term stability of the fluorescent properties, inorganic phosphors have been used. Unlike organic materials, which depend upon their chemical structure for the fluorescent properties, inorganic materials depend upon a particular crystal structure for their fluorescent properties. This means that they can not be used in solution and also when incorporated as a solid into other compositions, care must be taken not to destroy the crystal structure responsible for the fluorescent property. For example, when incorporating such inorganic phosphors as pigments in a paint or other coating composition, great care must be taken not to shear or grind the pigment, thereby, destroying its crystal structure, during the operations necessary to disperse the pigment in the paint or coating composition.

As a powder, or dispersed pigment, one particle overlaying another particle will shield the latter from the exciting light. This means that there is a practical limitation, both on the concentration of the dispersed pigment in the coating composition as well as on the thickness of the coating composition which is deposited on an object if it is desired to excite from one side of the layer, for example, a self-supporting film or a coating on a transparent substrate and have the light emitted from the fluorescent pigment visible on the other side.

I have now discovered that the bis-pyridinols having the above formula can be prepared by oxidative coupling of the corresponding pyridinol using lead dioxide as the oxidizing agent. Other oxidizing agents can be used, but are not as effective as lead dioxide. These bis-pyridinols are strongly fluorescent when irradiated with ultraviolet light. The compounds are readily soluble in common organic solvents and even very dilute solutions (less than 1 percent by weight) fluoresce strongly. The intensity of fluorescence is apparently invariant with the exciting wavelength of light in the range of from about 1,800 to 4,000 A., but thereafter decreases, approaching zero at approximately 5,200 A. The compounds are oxidatively and thermally stable and melt without decomposition. Therefore, they can be readily incorporated into a polymeric matrix, preferably one which is essentially colorless, by either solution or melt processing techniques. Only a very small amount, 1 percent by weight or less, is required to impart the strongly fluorescent color properties to the objects fabricated from the polymeric composition.

The particular color which is emitted by these compounds when excited by ultraviolet light is dependent upon the particular R substituent. When the R substituents are hydrogen the compound fluoresces blue-green. When the R substituents are halogen, alkoxy, alkyl or aralkyl the compounds all fluoresce with the same brilliant green color within the limits of detection. Since, the length of the alkyl chain in the R group has no effect on the emitted color, there is no incentive for having any alkyl substituent, either per se, or as part of the other substituents, e.g., alkoxy, aralkyl, etc., be anything but lower alkyl, i.e., having from one to eight carbon atoms, for example, methyl, ethyl, propyl, isopropyl, butyl (including the various butyl isomers), the various pentyl isomers, the various hexyl isomers (including cyclohexyl), the various heptyl isomers and the various octyl isomers. When the R substituents have aromatic or aliphatic unsaturation, preferably a phenyl ring or an olefinic group, which is conjugated with the unsaturation of the pyridine ring, i.e., there is unsaturation between at least the alpha and beta carbon atoms of the substituent, the spectrum of the emitted light is shifted to the longer wavelengths. A phenyl substituted olefinic group where the unsaturation of the phenyl group is conjugated with the unsaturation of the olefinic group, which in turn is conjugated with the unsaturation of the pyridine ring, will cause a greater shift than the same olefinic group without the phenyl substituent.

If the unsaturation of the substituent is not conjugated with the unsaturation in the pyridine ring, little if any noticeable shift in the wavelength of the emitted light over that of the unsubstituted, halo-substituted, or alkyl-substituted pyridine is noted. Therefore, when aliphatic unsaturation is present in the substituent, it preferably is between the alpha and beta carbon atom of the substituent with respect to the attachment to the pyridine ring if only a single unsaturated bond is present i.e., it has $\alpha,\beta$-unsaturation. If multiple aliphatic unsaturated bonds are present in the substituent they preferably are conjugated with each other and one of them is between the alpha and beta carbon atom. Olefinic unsaturation is at least as effective as acetylenic unsaturation in causing the shift in emmission. Since olefinically unsaturated substituents and especially $\alpha,\beta$-olefinically unsaturated substituents are more easily introduced on the pyridine ring, they are preferable to the corresponding acetylenic substituents. Although any aryl substituent can be used to provide aromatic unsaturation, aryl groups other than phenyl are not any more effective, are more difficult to introduce into the pyridine compounds and decrease the oxidative and thermal stability of the resulting compounds. Therefore, I prefer to use phenyl as the aryl substituent when aromatic unsaturation is desired. If the phenyl group is directly attached to the pyridine ring, the unsaturation of the phenyl group is conjugated with the unsaturation of the pyridine ring. However, it would be extremely difficult to produce the requisite phenyl substituted pyridinol or bipyridinol. It is much easier to have the phenyl group as a substituent on any olefinic group in which the olefinic unsaturation is already conjugated with the unsaturation of the pyridine ring. Introduction of electron donating groups as substituents on the phenyl group causes a still slightly further shift than is accomplished by the phenyl group itself. Unfortunately, such electron donating groups, for example, amino and mono and dialkyl substituted amino groups decrease the oxidation resistance of the compounds and their presence during their coupling reaction can cause some side reactions. Such substituents can be present on the phenyl group if the loss of oxidative stability can be tolerated but if present, preferably are introduced after the coupling reaction.

From what is said above, it is apparent that the conjugation of the unsaturation is desirable since it is a means of shifting the wavelength of the emitted light. However, where such shift is not desired, the unsaturation does not need to be conjugated with the unsaturation of the pyridine ring. Like the alkyl groups discussed above, the alkenyl groups preferably are lower alkenyl, examples of which are vinyl, allyl, 1,2-propenyl, the various butenyl isomers, the various butadienyl isomers, the various pentenyl isomers, the pentadienyl isomers up to and including the various octenyl isomers, the octadienyl isomers, octytrienyl isomers, etc. The phenyl substituted alkyl and phenyl substituted alkenyl may be any of the above alkyl and alkenyl groups having one or more phenyl groups substituted thereon, typical examples of which are: benzyl, α- and β-phenylethyl, α- and β-styryl, β,β-diphenylethenyl, 6-phenyl-1,3,5-hexatrienyl, etc.

Insofar as I can determine, the number of substituents of any one particular kind on the bis(3-pyridinols) has little if any effect on the shifting of the spectrum of the emitted light, for example, when all four Rs are methyl, the emitted light is essentially the same green color as obtained when only two of the R groups are methyl and the other two hydrogens and there is only a slight shift to a longer wavelength in the red region caused by an additional phenyl group in the β-diphenylethenyl group compared to the β-styryl (β-phenylethenyl) group.

Oxidative coupling of an equimolar mixture of two different 3-pyridinols, will produce a mixture of three 2,2'-bis(3-pyridinols) which can be separated. Two of the products will be the symmetrical compounds that would have been obtained if each of the 3-pyridinols had been coupled in separate reactions with the third product being the unsymmetrical product containing a pyridinol ring of each of the starting materials. This latter compound when irradiated with ultraviolet light will emit a color intermediate between the two colors produced by the symmetrical compounds. Although I have produced such compounds, basically there is no incentive towards doing this since the color I obtained is the same color that I can obtain by mechanically mixing or dissolving equimolar amounts of the two symmetrical compounds in a mutual solvent. By varying the proportions of the two compounds, I can obtain mixtures whose fluorescent colors cover the complete spectrum intermediate between the two emission colors of the compounds in the mixture.

Apparently the fluorescent properties of the bis(3-pyridinols) are related to hydrogen bonding occurring between the hydroxyl group in one pyridine ring with the nitrogen on the other pyridine ring. For example, if an ethanol solution of one of the bis(3-pyridinols) is titrated with alcoholic sodium hydroxide while being irradiated with ultraviolet light, the color emitted shifts gradually to shorter wavelengths until the monosalt is formed. As the titration is continued the intensity of the fluorescence decreases until sufficient alkali is added to form the di-salt at which point the fluorescence completely disappears.

Apparently, the mono-salt can only exist in solution, since on evaporation of the solution containing only a sufficient amount of sodium hydroxide to produce the mono-salt, the di-salt will precipitate leaving the balance of the bis(3-pyridinol) in the hydroxide form. This is easily followed under ultraviolet light since the di-salt will be completely colorless and the wavelength of the emitted color will shift back from the shorter wavelength of the mono salt in solution to the longer wavelength of the bis(3-pyridinol). Redissolving the mixture of the di-salt and the free bis(3-pyridinol) in solvent, will again form the color of the mono-salt. Unusual color effects can be obtained on chromatographic plates or even filter paper by first applying a spot of the solution of the mono salt and then rewetting the spot after the solvent evaporates and chromatographic separation of the mixtures occurs. Under ultraviolet irradiation, the colors change, disappear and reappear as the solvent evaporates and is replenished and as the di-salt gets separated from and changes the ratio present in the free bis(3-pyridinol) thereby changing the ratio of the latter to mono-salt on rewetting and dissolution. If the initial bis(3-pyridinol) fluoresces in the red region the more spectacular the various colors produced will be with the shift to the shorter wavelengths since the shifting occurs through a wider portion of the visible spectrum.

In order that those skilled in the art can readily understand my invention, the following examples are given by way of illustration and not by way of limitation. In all of the examples, parts and percentages are by weight and temperatures are in degrees centigrade. Where elemental analyses are given, the calculated values are given in parentheses following the determined values. The wavelengths reported are those where the emission spectrum of a methylene chloride solution of the compound shows a maximum.

The method of E. Koenigs, H.C. Gerdes and A. Sirot, Ber., 61, 1022 (1928) was used to prepare 6-chloro-3-pyridinol. The method of R. Adams and T.R. Govindachari, J. Am. Chem. Soc., 69, 1806 (1947), was used to prepare 6-methoxy-3-pyridinol. The method of E. Plazek, Ber., 72, 577 (1939) was used to prepare 4,6-dimethyl-3-pyridinol. Both 3-pyridinol and 6-methyl-3-pyridinol are commercially available. Lithiation of the latter compound by standard techniques lithiates the methyl group, a highly colored product which can be titrated with reactive halides or carbonyl compounds. This procedure was used to prepare the various high alkyl, phenyl-substituted alkyl and phenyl-substituted alkenyl compounds of the examples. The general procedure for preparing these derivatives is as follows:

A solution of 6-methyl-3-pyridinol in anhydrous tetrahydrofuran is cooled to 0° C., treated with two equivalents of n-butyllithium in hexane solution and stirred for approximately 1 hour to give a suspension of the deep red lithiated intermediate. Addition of one equivalent of an alkyl halide (methyl iodide, ethyl bromide, propyl bromide, benzyl chloride etc.) causes immediate discharge of the red color and the reaction mixture is then poured into water. Neutralization of the aqueous phase followed by extraction of the product with ether gives the 6-alkyl-3-pyridinol or 6-(phenylalkyl)-3-pyridinols.

Addition of one equivalent of an aldehyde or ketone (benzaldehyde, benzophenone, acetone etc.) to the lithiated pyridinol suspension causes immediate discharge of the red color and formation of an intermediate alcohol. Reaction with acetic anhydride gives a diacetate which on treatment with sodium bicarbonate undergoes an elimination reaction to form a 6-alkenyl-3-acetoxypyridine. Finally, hydrolysis with 20 percent aqueous sodium hydroxide gives the 6-alkenyl-3-pyridinol or 6-(phenylalkenyl)-3-pyridinol.

The general procedure for oxidative coupling of the various 3-pyridinols to their corresponding 2,2'-bis(3-pyridinols) was as follows:

A solution of the 3-pyridinol in benzene in which lead dioxide was suspended, was heated at reflux with stirring for a period of 12 hours. After filtering off the lead residue, various techniques were used to isolate the desired 2,2'-bis(3-pyridinols), as given in the specific examples.

EXAMPLE 1

A solution of 0.95 g. of 3-pyridinol in 100 ml. of hot benzene containing 1.20 g. of lead dioxide was reacted as described in the general procedure. After a short time, an intractable tarry material began to coat the lead dioxide causing it to deposit on the sides of the reaction vessel and interfering with the reaction. Thin layer and vapor phase chromatographs showed that the benzene soluble portion contained a large amount of the starting material and a small amount of compound having a brilliant blue-green fluorescense (4,800 A.) when exposed to ultraviolet light. Extraction of the tarry residue with hot benzene gave additional amounts of the two materials. The vpc retention time and the brilliant fluorescense indicated that the product was 2,2'-bis(3-pyridinol).

This product was synthesized by an independent method wherein commercially available 2-iodo-3-pyridinol in tetrahydrofuran at 0° C., was reacted with two equivalents of n-butyllithium followed by addition of one equivalent of copper trifluoroacetate and air oxidation for 10 minutes. The reaction mixture was poured into water, the aqueous phase separated and then acidified to pH 6. Extraction with ether and evaporation of the extract to dryness gave the desired 2,2'-bis(3-pyridinol) in a 27 percent yield along with a small amount of unreacted 2-iodo-3-pyridinol, which was separated from the desired product by preparative thin layer chromatography. This product likewise had a brilliant blue-green fluorescence, and had an identical vapor phase chromatography retention time and identical mass and infrared spectra with the product obtained by the lead dioxide oxidation process.

A portion of this product purified by recrystallization from ethanol followed by sublimation had a melting point of 188° - 190° and analyzed: C, 63.5 (63.8); H, 4.6 (4.3); N, 14.5 (14.9).

EXAMPLE 2

A solution of 1.09 g. of 6-methyl-3-pyridinol in 100 ml. of hot benzene was oxidatively coupled with 2.38 g. of lead dioxide using the general procedure. Thin layer and vapor phase chromatographs showed a single product containing unreacted starting material. Filtration and evaporation of the filtrate to dryness gave a residue weighing 0.85 g., which upon extraction with 20 percent petroleum ether gave a pale green, brilliantly fluorescent solid (5,050 A.). It was recrystallized from petroleum ether to give 0.23 g. of material having a molecular weight, determined by osmometry of 225±10 (216). The nmr and mass spectra and a comparison of infrared spectra with the same compound synthesized independently in low yield by heating a mixture of commercially available 2-iodo-6-methyl-3-pyridinol with copper powder and subliming the product as formed showed that the product was 2,2'-bis(6-methyl-3-pyridinol). After recrystallization from petroleum ether, the product had a melting point of 189° - 190° and analyzed: C, 66.8 (66.7); H, 5.6 (5.6); N, 13.0 (13.0).

EXAMPLE 3

A solution of 0.615 g. of 6-ethyl-3-pyridinol in 100 ml. of benzene was oxidatively coupled with 1.20 g. of lead dioxide by the general procedure. Thin layer and vapor phase chromatographs showed the presence of a single product with unreacted starting material. After filtration, the reaction mixture was chromatographed on 75 g. of silica gel. Elution with benzene/ether mixtures gave 0.164 g. of a pale green solid having a brilliant green fluorescence (5,050 A.). The IR spectrum showed very strongly hydrogen-bonded-OH in the 2,500 – 2,800 cm$^{-1}$ region indicative of the 2,2'-structure. The nmr and mass spectra also indicated that the product was 2,2'-bis(6-ethyl-3-pyridinol). Confirmation of the structure was obtained by reaction of the product of Example 2 with four equivalents of n-butyllithium followed by reaction with methyl iodide to give a product having the same mass and infrared spectra. After recrystallization from ether/30° – 60° petroleum ether, the product had a melting point of 117° – 119° and analyzed: C, 69.0 (68.8); H, 6.6 (6.6): N, 11.4 (11.5).

EXAMPLE 4

A solution of 0.137 g. of 6-n-propyl-3-pyridinol in 25 ml. of benzene was oxidatively coupled with 0.239 g. of lead dioxide using the general procedure. After filtration and solvent removal, extraction of the residue with 20 percent ether / 30° – 60° petroleum ether gave 0.047 g. of a pale green, brilliantly fluorescent crystalline solid (5,050 A.) which was further purified by recrystallization. Again, the IR spectrum showed strong hydrogen bonding of the hydroxyl group. The nmr and mass spectra indicated that the product was 2,2'-bis(6-propyl-3-pyridinol). This was confirmed by independent synthesis from the product of Example 2 by lithiation and reaction with ethyl bromide. The recrystallized product had a melting point of 90° – 91° C., and analyzed: C, 70.7 (70.6); H, 7.4 (7.4); N, 10.2 (10.3).

When this example was repeated but using an equivalent amount of 6-n-butyl-3-pyridinol in place of the 6-n-propyl-3-pyridinol, the product was identified as 2,2'-bis-(6-butyl-3-pyridinol).

EXAMPLE 5

A solution of 0.199 g. of 6-(2-phenylethyl)-3-pyridinol in 20 ml. of benzene was oxidatively coupled with 0.239 g. of lead dioxide by heating for 8 hours at reflux. After filtration of the reaction mixture to remove the lead oxide, the residue obtained by evaporation of the solvent was redissolved in ether / 30° – 60° petroleum ether and crystallized by cooling in a solid carbon dioxide-acetone bath to give 0.061 g. of a pale yellow solid which under ultraviolet light had a strong green fluorescence (5,050 A.). Infrared, nmr and mass spectra showed the compound to be 2,2'-bis[6-(2-phenylethyl)-3-pyridinol]. The same product was also obtained by lithiating the product of Example 2 and reaction with benzyl chloride. After recrystallization from ethanol-water, the product had a melting point of 151° - 52° and analyzed: C, 78.7 (78.8); H, 6.2 (6.1); N, 6.9 (7.1).

EXAMPLE 6

A solution of 0.129 g. of 6-chloro-3-pyridinol in 20 ml. of benzene was oxidatively coupled with 0.238 g. of lead dioxide by the general procedure. Filtration and evaporation of the filtrate to dryness gave 0.036 g. of a residue which on treatment with a limited quantity of methylene dichloride dissolved the desired product from the unreacted starting material. After evaporating the solvent and sublimation, 0.016 g. of a solid was obtained which under ultraviolet light had a pale green brilliant fluorescense (5050A.). It had a melting point of 228° – 230°, and was shown by nmr and mass spectra to be the desired 2,2'-bis(6-chloro-3-pyridinol).

EXAMPLE 7

A solution of 0.13 g. of 4,6-dimethyl-3-pyridinol in 20 ml. of benzene was oxidatively coupled with 0.239 g. of lead dioxide using the general procedure. The product was isolated from the filtrate by evaporation of the solvent and extraction of the residue with hot 30° – 60° petroleum ether as a solid which under ultraviolet light had a pale green, brilliant fluorescence (5,050 A.). Sublimation under reduced pressure gave 0.029 g. of an essentially pure product, which was shown by infrared, nmr and mass spectra to be 2,2'-bis-(4,6-dimethyl-3-pyridinol). After repeated recrystallizations from hexane-ether, the product had a melting point of 238° – 240° and analyzed: C, 68.9 (68.8); H, 6.7 (6.6); N, 11.3 (11.5).

EXAMPLE 8

A solution of 0.125 g. of 6-methoxy-3-pyridinol in 20 ml. of benzene was oxidatively coupled with 0.239 g. of lead dioxide by stirring at room temperature for 12 hours. Thin layer and vapor phase chromatography showed a small amount of unreacted starting material and two major products, only one of which had hydroxyl groups. The desired product was separated by filtration of the benzene solution followed by extraction with 5 portions of 2N sodium hydroxide. Neutralization of the base extract with dilute sulfuric acid, extraction with ether, drying of the ether extract over sodium sulfate and evaporation to dryness gave 0.05 g. of a solid which under ultraviolet light had a pale green, brilliant fluorescence (5,050 A.). The nmr and mass spectra showed that the compound was 2,2'-bis(6-methoxy-3-pyridinol). After recrystallization and sublimation, the product had a melting point of 191° – 193° and analyzed: C, 58.2 (58.1); H, 4.9 (4.9); N, 11.2 (11.3).

EXAMPLE 9

When equimolar amounts of 6-methyl-3-pyridinol and 6-ethyl-3-pyridinol were cooxidized by the general procedure, 3 products were obtained; the 2 symmetrical dimers, 2,2'-bis(6-methyl-3-pyridinol) and 2,2'-bis(6-ethyl-3-pyridinol) and the mixed dimer 3,3'-dihydroxy-6-ethyl-6'-methyl-2,2'-bipyridine. The latter product was identified by its nmr and mass spectra. All 3 compounds fluoresce a brilliant green under ultraviolet light (5,050 A.).

EXAMPLE 10

A solution of 6.7 g. of 6-(2-styryl)-3-pyridinol, also called 6-(2-phenylethenyl)-3-pyridinol, in 300 ml. of benzene was oxidatively coupled with 16.2 g. of lead dioxide using the general procedure, but refluxed for 20 hours. After filtration, the filtrate on evaporation gave a tarry residue from which the product was isolated by preparative thin layer chromatography. Recrystallization from glyme, the dimethyl ether of ethylene glycol, gave red needles having brilliant red-orange fluorescence under ultraviolet light (5,750 A.). The melting point was 230°. The uv and ir spectral characteristics were consistent with the expected product 2,2'-bis-[6-(2-styryl)-3-pyridinol] which can also be named 2,2'-bis-[6-(2-phenylethenyl)-3-pyridinol]. Confirmation of the compound was obtained by hydrogenation of the product which converted it to a pale green solid having brilliant green fluorescence (5,050 A.) under uv light and which was shown to be identical with the product produced in Example 5 by vapor phase chromatography retention time and infrared spectra.

EXAMPLE 11

A solution of 1.49 g. of 6-isobutenyl-3-pyridinol in 100 ml. of benzene was stirred 12 hours at room temperature with 2.39 g. of lead dioxide. After filtration and solvent removal the dark-colored residue was distilled to give an orange crystalline product which had a brilliant yellow fluorescence (5,500 A.). Recrystallization from ether gave 0.46 g. of pure material which was shown to be 2,2'-bis(6-isobutenyl-3-pyridinol) by ir, nmr and mass spectra.

EXAMPLE 12

A solution of 0.253 g. of 6-(2,2-diphenylethenyl)-3-pyridinol in 10 ml. of benzene was heated under reflux with 0.44 g. of lead dioxide for 90 hours. After filtration and solvent removal the reaction mixture was separated by preparative thin layer chromatography to give 0.044 g. of pure material. The product was an orange-red solid with a brilliant orange-red fluorescence (5,800 A.). Its identity as 2,2'-bis[6-(2-diphenylethenyl)-3-pyridinol] was established from uv, ir and mass spectra.

EXAMPLE 13

A benzene solution containing equimolar amounts of 6-methyl-3-pyridinol and 6-(2-phenylethenyl)-3-pyridinol was heated under reflux with lead dioxide for 20 hours. The products were isolated by preparative vapor phase chromatography. Two of them were identical with the symmetrical dimers obtained in Examples 5 and 10. The remaining product was an orange solid with a brilliant yellow fluorescence (5,500 A.). Its identity as the mixed dimer 6-(2-phenylethenyl)-6'-methyl-2,2'-bis(3-pyridinol) was established from ir, nmr and mass spectra.

EXAMPLE 14

Fluorescent lacquers were obtained by dissolving polymethylmethacrylate and a small amount (0.1-3 percent based on the weight of polymer) of one or more 2,2'-bis(3-pyridinols) in methylene chloride, the color of the fluorescence being determined by substituents on the pyridine nucleus as discussed above.

Gas discharge lamps emitting light of wavelengths which readily pass through the glass envelope of the lamps and excite the fluorescence of the 2,2'-bis(3-pyridinols) were coated by dipping in the lacquers and air drying for 1–2 hours. When energized the lamps produced light which was the color produced by the fluorescence of the particular 2,2-bis-(3-pyridinol) in the coating on the envelope.

The above examples have illustrated many of the variations and modifications of the invention. Many other wide and useful applications, in addition to those already disclosed may be made of the compositions of this invention, especially when incorporated in various resin compositions. Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States Patent Office is:

1. Chemical compounds having the formula,

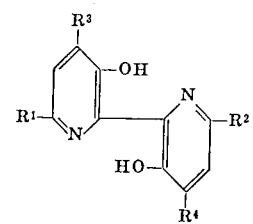

where $R^1$, $R^2$, $R^3$ and $R^4$ are independently selected from the group consisting of hydrogen, halogen, lower alkoxy, lower alkyl, and lower alkenyl.

2. The compounds of claim 1 wherein $R^1$, $R^2$, $R^3$ and $R^4$ are lower alkyl.

3. The compounds of claim 1 wherein $R^1$ and $R^2$ are lower alkyl and $R^3$ and $R^4$ are hydrogen.

4. The compound of claim 1 wherein $R^1$ and $R^2$ are methyl and $R^3$ and $R^4$ are hydrogen.

5. The compound of claim 1 wherein $R^1$ and $R^2$ are 1-isobutenyl and $R^3$ and $R^4$ are hydrogen.

* * * * *